Dec. 6, 1966  J. McDANIEL AMMERMAN  3,290,533
CONJOINTLY-MOVABLE CAM-ACTUATED SUPPORT MEANS
FOR MAGNETS IN COLOR KINESCOPES
Filed April 23, 1964

INVENTOR.
JOHN McDANIEL AMMERMAN
BY
W.H.Sponagle
Attorney

United States Patent Office 3,290,533
Patented Dec. 6, 1966

3,290,533
CONJOINTLY-MOVABLE CAM-ACTUATED SUPPORT MEANS FOR MAGNETS IN COLOR KINESCOPES
John McDaniel Ammerman, Indianapolis, Ind., assignor to Radio Corporation of America, a corporation of Delaware
Filed Apr. 23, 1964, Ser. No. 361,951
6 Claims. (Cl. 313—77)

The present invention relates generally to article supporting structures of a form permitting and facilitating adjustment of the relative spatial positioning of the supported articles.

A particular contemplated use for supporting structures in accordance with the present invention is service as the adjustable mount for a plurality of permanent magnets employed for beam position adjustment in a color image reproducing device.

A widely used form of color image reproducing device is the tri-gun, shadow-mask color kinescope. In operation of such a kinescope, it is intended that each of the beams produced by the three guns of the tube should selectively excite a particular set of phosphor dots luminescing in a particular primary color. To ensure that a particular beam selectively excites its assigned phosphor dots, the beam must approach the apertures of the shadow-mask that precedes the phosphor screen with the proper angle of approach. It is also important that the plurality of beams converge at the target to effect light production at coincident target regions. For such convergence purposes, there is conventionally associated with the tri-gun color kinescope a set of beam convergence magnets for effecting adjustment of the respective beam positions prior to their deflection.

Such beam convergence structures are usually called upon for both static and dynamic adjustments. The so-called static adjustments are made to ensure the establishment of the proper beam convergence at the center of the phosphor screen; the dynamic adjustments then serve to ensure maintenance of the proper convergence for the bundle of beams throughout their deflection from the center in the course of the raster scanning process.

To achieve the center-of-the-screen static beam convergence, it has proved convenient to provide individual adjustment magnets for each beam, each magnet being subject to manual adjustment to vary the position of the associated beam in a radial direction with respect to the kinescope axis. The guns of the conventional tri-gun, shadow-mask color kinescope are disposed in a triangular configuration within the kinescope neck; the triangle is conventionally oriented in such manner that the blue phosphor exciting gun is positioned along a radius which extends from the axis vertically (in terms of the normal display position of the phosphor screen). It will be appreciated that with such a positioning of the blue gun, adjustment of the blue beam position along a radius from the tube axis corresponds to adjustment of the blue beam in a vertical direction.

In order to provide ability to correct for all possible misconvergence errors, it is necessary to supplement the three individual beam adjustments in respective radial directions with a fourth adjustment parameter. It can readily be shown that if individual beam adjustments along respective radii are supplemented by beam adjustment of just one of the three beams in a direction at right angles to the radial direction of adjustment for that beam, all patterns of misconvergence at the center of the screen are amenable to correction.

It is convenient, and has become customary, to associate the required fourth beam position adjustment parameter with the blue beam; i.e. to provide an adjustment of the blue beam position in a lateral or horizontal direction. In order for the four parameters of beam adjustment to be independent, the lateral adjustment of the blue beam generally should not affect the positioning of the remaining beams; this rule is subject, however, to one exception: movement of the other beams in the opposite lateral direction is readily tolerable and, indeed, desirable, since this accentuates the desired adjustment of the relative beam positions when controlling this fourth parameter.

To provide the noted blue lateral adjustment, a number of magnetic deflection schemes have been proposed and utilized. Common, however, to these prior art approaches has been the use of internal field shaping or directing structures; i.e. these approaches have relied upon magnetic straps or pole pieces within the kinescope itself to confine or direct the magnetic field of the external magnetic adjustor.

It has been found in work on color kinescopes having wide angle (e.g. 90° or more) deflection that the presence of internal magnetic structure for effecting the blue lateral adjustment is undesirable. A desired feature of such wide-angle color kinescopes is the ability to provide a relatively shortened neck for the kinescope. However, shortening of the neck requires closer spacing of the various magnetic beam adjusting devices that conventionally encircle the color kinescope neck. The problem of preventing undesired interaction between these closely adjacent devices is magnified by any significant shortening of the neck length. In this regard, the presence of internal pole pieces in conjunction with the blue lateral adjustor has been found to cause serious distortion of the color purity field when the color purity and blue lateral adjustors are closely spaced in adjacence on a short-neck kinescope.

In a co-pending application Serial No. 362,092 of Eugene Lemke and Philip G. McCabe, entitled, 'Magnetic Beam Control," and filed concurrently herewith, a magnetic beam adjustment arrangement is proposed for achieving the desired lateral deflection without need for reliance upon internal magnetic structures. In accordance with an invention embodiment disclosed in said Lemke et al. application, the lateral adjustment is effected through use of an arrangement of four bar magnets disposed in pairs. For lateral adjustment of the blue beam in a first direction, a first pair of magnets oriented with the north poles thereof in adjacency is disposed externally of the kinescope neck in the vicinity of the blue beam position, while a second pair of magnets oriented with the south poles thereof in adjacency is disposed on the opposite side of the kinescope neck in a location diametrically opposed to the location of the first pair. To control the magnitude of the lateral beam shift introduced by the fields of the magnets, both of the magnet pairs are subject to conjoint alteration of their proximity to the tube neck central axis; however, at all positions in the range of movement of the magnet pairs away from or toward the tube neck axis, the magnet pair in the vicinity of the blue beam position is closer to the tube neck axis than the diametrically opposed magnet pair by some predetermined distance. When lateral shift of the blue beam in a direction opposite to said first direction is desired, the relative positioning of the two magnet pairs is reversed; i.e., the magnet pair having adjacent south poles is disposed in the vicinity of the blue beam position, and occupies the position of greatest proximity to the tube neck axis throughout the range of conjoint alteration of the axial proximity of the magnet pairs.

For an explanation of the theory of operation of the above-described magnet arrangement, whereby essential confinement of beam position adjustment to shifts in the desired lateral directions is realized, reference may be made to the above-identified Lemke, et al. application. The present invention is concerned with the provision of an adjustable mounting of a character suitable for achieving the magnet support and positional adjustment functions required in the beam control arrangement of the Lemke, et al. application. A mounting suitable for such purposes is provided by the present invention with the advantages of simplicity of construction, ease of assembly and disassembly, and convenience and accuracy of adjustment.

In accordance with an embodiment of the present invention, an adjustable mounting includes a main support member having a cylindrical outer surface and an interior cylindrically walled aperture eccentrically related to the cylindrical outer surface. A generally cylindrical guide member is mounted on the main support member, and may be rotated about the cylindrical outer surface of the main support. Integral with the guide member are two raised cage pieces in diametrically opposed positions on the guide, the sides of each cage being slotted. A holder piece is associated with each cage and provided with projecting lugs at each end thereof which extend into the cage side slots. Surrounding the periphery of the cylindrical guide, to the rear of the cage locations, is a rotatable, disc-like cam member, the surface of the cam member adjacent to the cage locations being provided with a pair of interleaved spiral grooves. Each holder piece is provided with a pair of rearwardly projecting pins; the pins of one holder ride in a first of the spiral grooves, while the pins of the other holder ride in the second.

As the cam is rotated, the spiral grooves impart motion to the holders, the groove interleaving being such as to cause conjoint outward or inward motion of the two holders. Engagement with the cage side slots provides guiding action restricting holder motion to directions in a plane perpendicular to the axis of the interior aperture. By 180 degree rotation of the guide member itself, the relationship of the respective holders to the eccentric interior aperture may be reversed.

In use for the magnetic beam control purposes of the previously mentioned Lemke et al. application, the neck of a color kinescope is received in the interior aperture and the respective holders serve to retain the respective magnet pairs of hte Lemke et al. arrangement.

A primary object of the present invention is to provide a novel adjustable mount for articles, said mount being subject to convenient adjustment of the relative spatial positions of the supported articles.

A further object of the present invention is to provide novel adjustable supporting means suitable for supporting and adjusting the relative spatial positions of a plurality of magnets in a magnetic beam control arrangement for a color image reproducing tube.

Other objects and advantages of the present invention will be readily apparent to those skilled in the art after a reading of the following detailed description and an inspection of the accompanying drawings in which.

Figure 1:
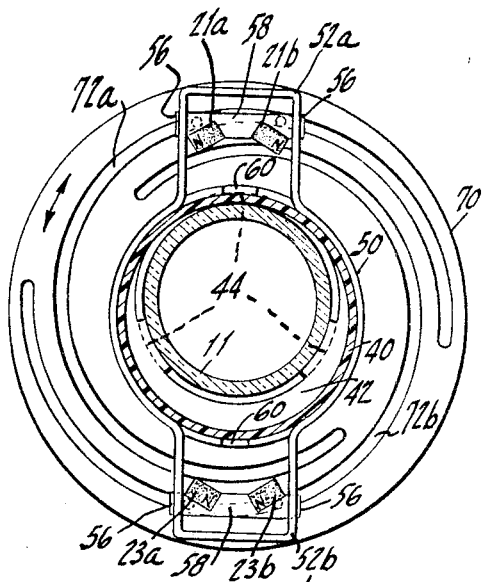
FIGURES 1 and 2 illustrate end views (partially in section) of an adjustable mount embodying the principles of the present invention, the mount being positioned on the neck of an image reproducing tube and serving to support an array of beam control magnets, and the two end views illustrating respectively different positions of adjustment of the magnet locations.
Figure 2:
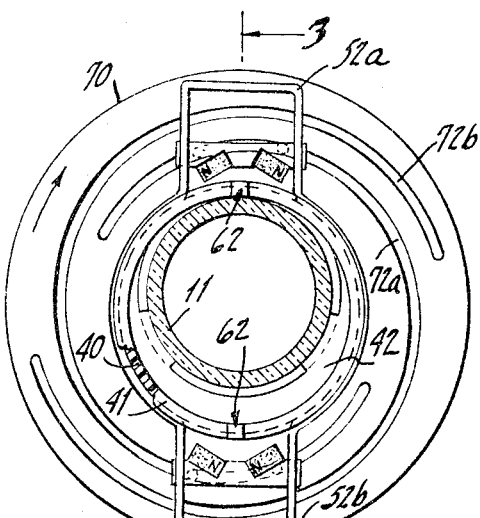
Figure 3:
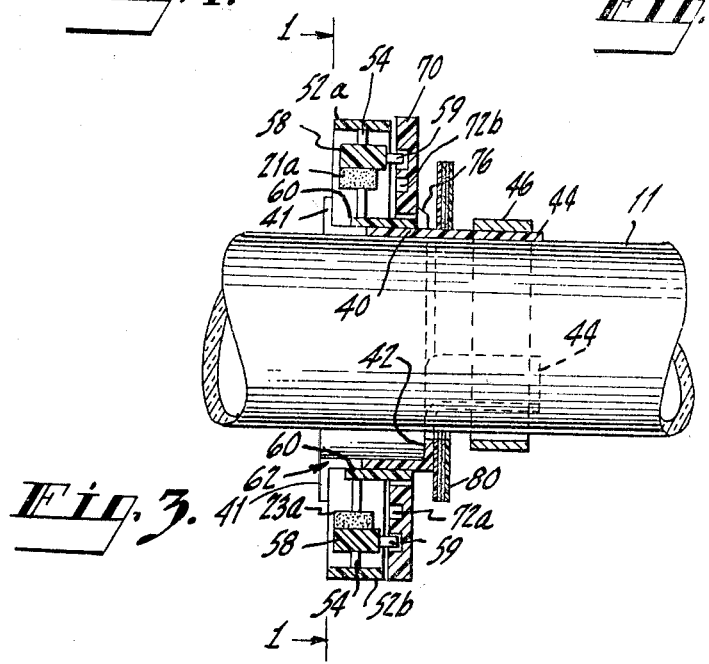
FIGURE 3 illustrates a side view, in section, of the adjustable mount of FIGURES 1 and 2.

The holder structure of FIGURES 1, 2 and 3 includes a main cylindrical support member 40 which is adapted to encircle the neck 11 of a color kinescope to provide an outer cylindrical surface eccentrically related to the cylindrical neck. A generally crescent-shaped web or diaphragm member 42 extending within the cylindrical body of member 40 abuts a major portion of the outer surface of the kinescope neck, establishing the eccentricity of the outer cylindrical surface. Proper orientation of this web member 42 with respect to the circumference of the tube neck shifts the axis of the cylindrical surface of member 40 in a downward vertical direction relative to the tube neck axis. The support member 40 is provided at one end with a raised cylindrical flange 41, and at the opposite end with a trio of fingerlike extensions 44, which extend longitudinally with respect to the tube axis from one end of the main cylindrical body of the support. These fingers abut the outer surface of the kinescope neck, and receive a clamping strap 46, which encircles the tube neck in abutment with the outer surface of the fingers 44. The strap 46 is provided with suitable means (not illustrated) for tightly securing the strap to lock the support member 40 in position on the tube neck.

Surrounding the main cylindrical portion of support member 40 is a generally cylindrical guide member 50. Integral with the main cylindrical portion of the guide member 50 are two raised cage members 52a, 52b attached to the periphery of the cylindrical portion in positions 180° apart. Each of the cage members 52a and 52b have respective slots 54 extending longitudinally in the central portion of each cage side member, the slots thus extending at right angles to the longitudinal axis of the tube neck 11. The pair of slots of each cage member are in registry with each other, and are adapted to receive respective end flanges 56 of a magnet holder 58.

Each magnet holder 58 incorporates a pair of oppositely, inwardly canted magnet receiving grooves, within which are secured (e.g., with glue) individual permanent magnets. The grooves of the magnet holder 58 associated with the cage 52a are shown as receiving the individual bar magnets 21a and 21b, whereas the grooves of the holder 58 associated with cage 52b are shown as receiving the individual bar magnets 23a and 23b. The poling of the top pair of bar magnets 21a and 21b is that such that the respective south poles thereof adjoin, whereas the poling of the bottom bar pair 23a and 23b is such that the north poles thereof adjoin.

The portions of the cylindrical body of guide member 50 bridged by the respective cage members 52a and 52b are cut away, with the exception of lug projections 60, which constitute finger-like continuations of the main cylindrical body of the guide 50 in line with the center of each overlying cage. The main cylindrical body of the support member 40 is provided with a pair of slots 62 at its flanged end. The lugs 60 are intended for releasable detention in the slots 62, whereby the guide 50 is alterable between two rotational positions about the support member 40. In one position, the cage 52a, retaining the holder for the south pole-adjoining pair of magnets, is positioned at the top of the structure (i.e., in that position permitting close approach of the magnets to the kinescope envelope) while the cage 52b is positioned at the bottom of the structure, more remote from the tube envelope due to the interposition of web member 42. In the second position, the respective cages are reversed, with the cage 52b, retaining the holder the north pole-adjoining magnets, being located at the top of the structure, permitting close approach of this magnet pair to the tube envelope. A contemplated alternative to use of the illustrated lug 60-slot 62 engagement (to effect releasable detention of the guide 50 in the selected rotational position about support 40) involves use of a spring-detent attached to one of the cage members and subject to engagement in appropriately located notches in the flange 41 of support member 40.

Surrounding the periphery of the cylindrical body portion of guide 50, to the rear of the cage locations (as viewed in FIGURES 1 and 2), is a rotatable, disc-like cam member 70. The surface of the cam member 70 adjacent to the cage location is provided with a pair of interleaved spiral grooves 72a and 72b. Each of the magnet holders 58 is provided with a pair of rearwardly projecting pins 59. The pins of the holder retained by cage 52a ride in the spiral groove 72a, while the pins of the holder retained by the cage 52b ride in the groove 72b.

As the cam member 70 is rotated about the bearing surface provided by the cylindrical body of guide 50, the spiral grooves of the cam serve to impart vertical motion to the respective holders 58. The respective grooves 72a and 72b are interleaved in such manner as to cause upward motion of the holder in cage 52b when the holder in cage 52a receives downward motion, and vice versa. As the grooves of the member 70 cam the respective holders upwardly or downwardly, the engagement of flanges 56 with slots 54 provide guiding action restricting the holder to motion in a vertical direction, and retaining the holders pins in the respective grooves of cam 70.

The magnet adjustment motion thus provided by the support and adjustment structure of FIGURES 1, 2 and 3 is that desired for the purposes of the Lemke, et al. application, previously discussed herein.

While not illustrated in complete detail, it may be noted that the guide member 50 is conveniently provided with several turned up detent projections 76 about the periphery of its rearmost edge to acts as stops for the rear surface of the cam member 70. Likewise, the main cylindrical body portion of support member 40 may be provided with outwardly projecting detents (not illustrated) at the rear edge thereof to serve as stops for the rear edge of the cylindrical body of guide 50. Additionally, the fingerlike projections 44 at the rear of support member 40 are made sufficiently long so as to provide sufficient space along the tube axis between the strap 46 location and the rear wall of the web member 42 to accommodate the location of a purity-correcting magnetic ring structure 80 (serving a well-known color kinescope beam adjusting function, not necessary to further discuss here). The purity rings rotate about a bearing surface provided by the fingers 44; outwardly projecting detents (not illustrated) of the fingers 44 serve, together with the rear wall of the web member 42, to fix the location of the purity ring structure 80 longitudinally with respect to the tube neck 11.

As symbolically designated in cross-sectional views thereof in the drawing, various members of the illustrated structure, including the support member 40, web member 42, fingers 44, guide member 50, cage members 52a, 52b, magnet holders 58 and cam member 70, may all be formed (as by molding) of suitable plastic material, whereby moderate structure weight, material cost, and production intricacy may be realized. The above-discussed detent projections, serving as stops for various movable elements in the assembled structure, may be suitably levered, or otherwise depressible, to permit simple slip-over assembly and disassembly of the structure members.

What is claimed is:
1. An adjustable mounting, including in combination:
  (1) a support member, having a centrally disposed cylindrical aperture, and comprising (a) a first portion presenting a cylindrical outer surface, and (b) a second portion including a pair of generally U-shaped projections extending outwardly from respective diametrically opposed positions along the periphery of said centrally disposed cylindrical aperture, with the base of each U-shaped projection linking the two sides thereof at a distance from the axis of symmetry of said cylindrical aperture in excess of the distance therefrom of said outer surface of said first portion, and with an elongated slot in each of said projection sides extending in a direction perpendicular to said base;
  (2) a pair of article holders, each holder comprising an article supporting body disposed between the two sides of a respective one of said U-shaped projections, and projecting lugs at opposing ends of said body, said lugs being received in the slots in said sides;
  (3) a cam member encircling said first portion of said support member and supported for rotation on said cylindrical outer surface, a surface on said cam member facing toward said U-shaped projections being grooved with a pair of interleaved, spiral grooves;
  (4) means retained in one of said pair of spiral grooves for supporting the body of one of said pair of article holders at a distance from said axis determined by the rotational position of said cam member; and
  (5) means retaining in the other of said pair of spiral grooves for supporting the body of the other of said pair of article holders at a distance from said axis determined by the rotational position of said cam member.

2. An adjustable mounting, including in combination:
  (1) a first support member, having a centrally disposed cylindrical aperture, and comprising (a) a first portion presenting a cylindrical outer surface concentric with said centrally disposed cylindrical aperture, and (b) a second portion including a pair of generally U-shaped projections extending outwardly from respective diametrically opposed positions along the periphery of said centrally disposed cylindrical aperture, with the base of each U-shaped projection linking the two sides thereof at a distance from the axis of symmetry of said cylindrical aperture in excess of the distance therefrom of said outer surface of said first portion, and with an elongated slot in each of said projection sides extending in a direction perpendicular to said base;
  (2) a pair of article holders, each holder comprising an article supporting body disposed between the two sides of a respective one of said U-shaped projections, and projecting lugs at opposing ends of said body, said lugs being received in the slots in said sides;
  (3) a disc-shaped cam member encircling said first portion of said first support member and supported for rotation on said cylindrical outer surface, a surface of said cam member facing toward said U-shaped projections being grooved with a pair of interleaved, spiral grooves;
  (4) means retained in one of said pair of spiral grooves for supporting the body of one of said pair of article holders at a distance from said axis determined by the rotational position of said cam member;
  (5) means retained in the other of said pair of spiral grooves for supporting the body of the other of said pair of article holders in a position diametrically opposed to the position of said one holder body, and at a distance from said axis determined by the rotational position of said cam member and generally corresponding in magnitude to said first-named distance; and
  (6) a second support member having a cylindrical outer surface received within said cylindrical aperture of said first support member and concentric therewith, said first support member being supported for rotation on said cylindrical outer surface of said second support member, and said second support member being pierced by a cylindrical aperture located in eccentric relationship to said cylindrical outer surface of said second support member whereby the distances from the axis of symmetry of said eccentrically located aperture to the respective bodies of said pair of article holders differ from each other at all rotational positions of said cam member.

3. An adjustable magnet mounting, including in combination:
  (1) a support member, having a centrally disposed cylindrical aperture, and comprising (a) a first portion presenting a cylindrical outer surface, and (b) a second portion including a pair of generally U-shaped projections extending outwardly from respective diametrically opposed positions along the periphery of said centrally disposed cylindrical aperture, with the base of each U-shaped projection linking the two sides thereof at a distance from the axis of symmetry of said cylindrical aperture in excess of the distance therefrom of said outer surface of said first portion, and with an elongated slot in each of said projection sides extending a direction perpendicular to said base;

(2) a pair of magnet holders, each holder comprising a magnet-supporting body disposed between the two sides of a respective one of said U-shaped projections, and projecting lugs at opposing ends of said body, said lugs being received in the slots in said sides;

(3) a disc-shaped member encircling said first portion of said support member and supported for rotation on said cylindrical outer surface, a surface of said disc-shaped member facing toward said U-shaped projections being grooved with a pair of interleaved, spiral grooves;

(4) means retained in one of said pair of spiral grooves for supporting the body of one of said pair of magnet holders at a distance from said axis determined by the rotational position of said disc-shaped member; and (5) means retained in the other of said pair of spiral grooves for supporting the body of the other of said pair of magnet holders at a distance from said axis determined by the rotational position of said disc-shaped member.

4. An adjustable magnet mounting, including in combination:

(1) a first support member, having a centrally disposed cylindrical aperture, and comprising (a) a first portion presenting a cylindrical outer surface concentric with said centrally disposed cylindrical aperture, and (b) a second portion including a pair of generally U-shaped projections extending outwardly from respective diametrically opposed positions along the periphery of said centrally disposed cylindrical aperture, with the base of each U-shaped projection linking the two sides thereof at a distance from the axis of symmetry of said cylindrical aperture in excess of the distance therefrom of said outer surface of said first portion, and with an elongated slot in each of said projection sides extending in a direction perpendicular to said base;

(2) a pair of magnet holders, each holder receiving a pair of permanent magnets and comprising a magnet-supporting body disposed between the two sides of a respective one of said U-shaped projections, and projecting lugs at opposing ends of said body, said lugs being received in the slots in said sides;

(3) a disc-shaped cam member encircling said first portion of said first support member and supported for rotation on said cylindrical outer surface, a surface of said cam member facing toward said U-shaped projections being grooved with a pair of interleaved, spiral grooves;

(4) means retained in one of said pair of spiral grooves for supporting the body of one of said pair of magnet holders at a distance from said axis determined by the rotational position of said cam member;

(5) means retained in the other of said pair of spiral grooves for supporting the body of the other of said pair of magnet holders in a position diametrically opposed to the position of said one holder body, and at a distance from said axis determined by the rotational position of said cam member and generally corresponding in magnitude to said first-named distance; and (6) a second support member having a cylindrical outer surface received within said cylindrical aperture of said first support member and concentric therewith, said first support member being supported for rotation on said cylindrical outer surface of said second support member, and said second support member being pierced by a cylindrical aperture located in eccentric relationship to said cylindrical outer surface of said second support member whereby the distances from the axis of symmetry of said eccentrically located aperture to the respective bodies of said pair of magnet holders differ from each other at all rotational positions of said cam member.

5. Apparatus for adjustably supporting a plurality of beam shifting magnets on the neck of a color kinescope, said apparatus comprising the combination of:

a pair of magnet holders;

a main support member having an aperture for receiving said neck;

a guide member supported for rotation on a cylindrical surface provided on said main support member in eccentric relationship to said neck-receiving aperture, said guide member including means for providing respective guideways in which said magnet holders may ride, said guideways permitting motion of said magnet holders in a plane perpendicular to the axis of symmetry of said neck-receiving aperture; and cam means for simultaneously adjusting the positions of both of said pair of magnet holders in their respectively associated guideways in such manner as to alter the proximity of both of said pair of magnet holders to said neck-receiving aperture in the same sense.

6. Apparatus for adjustably supporting a plurality of beam positioning magnets on the neck of a color kinescope, said apparatus comprising the combination of:

a pair of magnet holders;

a main support member having a neck-receiving aperture;

a guide member supported for rotation on a cylindrical surface provided on said main support member in eccentric relationship to said neck-receiving aperture, said guide member including means for providing respective guideways in which said magnet holders may rise, said guideways permitting motion of said magnet holders in a plane perpendicular to the axis of symmetry of said neck-receiving aperture; and a cam member mounted for rotation upon a surface of said guide member, said cam member having a pair of camming grooves, with each of said pair of magnet holders contacting a respectively different one of said pair of camming grooves so as to achieve adjustment of the positions of both of said pair of magnet holders in their respectively associated guideways when said cam member is rotated about said guide member.

No references cited.

JAMES W. LAWRENCE, *Primary Examiner.*

V. LAFRANCHI, *Assistant Examiner.*